United States Patent [19]

Berke

[11] 4,047,477
[45] Sept. 13, 1977

[54] HOT DOG BUN BAKING PAN

[76] Inventor: Julius B. Berke, 21205 Saticoy St., Apt. 10, Canoga Park, Calif. 91304

[21] Appl. No.: 619,598

[22] Filed: Oct. 17, 1975

[51] Int. Cl.² .............................................. A21B 5/02
[52] U.S. Cl. ...................................... 99/428; 99/383; 249/92
[58] Field of Search .......................... 99/381, 382–383, 99/384, 426, 428, 441; 249/92, 151; 24/DIG. 9, 259 RC, 259 B, 259 SG, 259 FS

[56] References Cited

U.S. PATENT DOCUMENTS

| | | | |
|---|---|---|---|
| 1,106,042 | 8/1914 | Gumm | 249/151 |
| 1,139,037 | 5/1915 | Huth | 99/428 X |
| 1,589,849 | 6/1926 | Haskell | 99/428 X |
| 2,252,990 | 8/1941 | Smith | 249/151 |
| 2,559,464 | 7/1951 | Roberg | 24/259 RC X |
| 2,937,092 | 5/1960 | Zitin | 99/428 UX |
| 3,158,087 | 11/1964 | Hedglin | 99/428 |
| 3,229,615 | 1/1966 | Rattner | 99/428 X |
| 3,326,119 | 6/1967 | Smith | 99/428 |
| 3,943,840 | 3/1976 | Bolte | 99/428 |

Primary Examiner—Harvey C. Hornsby
Assistant Examiner—Arthur O. Henderson
Attorney, Agent, or Firm—Jack C. Munro

[57] ABSTRACT

A baking pan for the producing of an elongated hot dog receiving recess within a hot dog bun, said baking pan comprising a base having a plurality of dough receiving recesses, a member adapted to overlie said base, said member having a plurality of elongated oval shaped in cross section rods with each said rod adapted to be located slightly above each dough receiving recess and longitudinally thereacross, the member being securable by securing means to the base when the member is connected to the base, guide means to precisely position the member upon the base.

2 Claims, 8 Drawing Figures

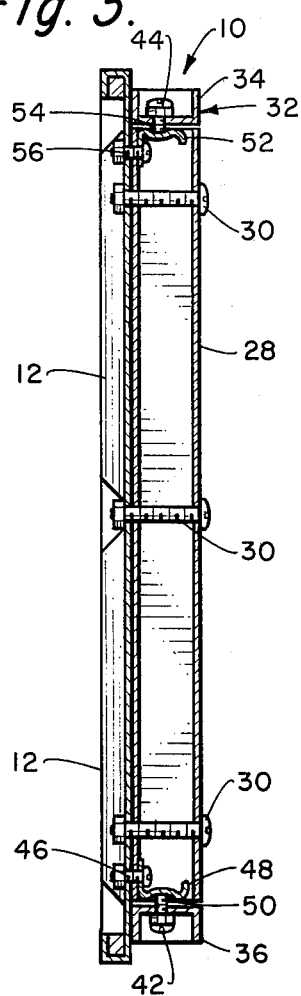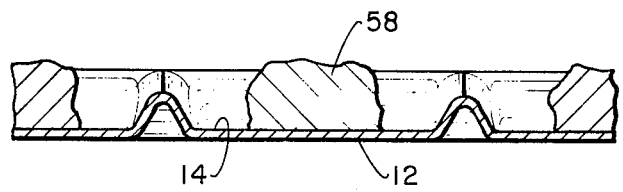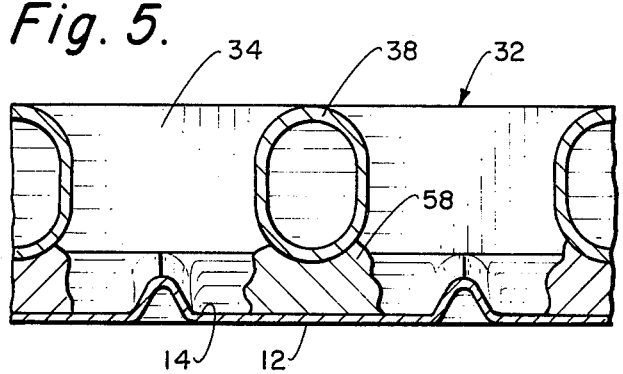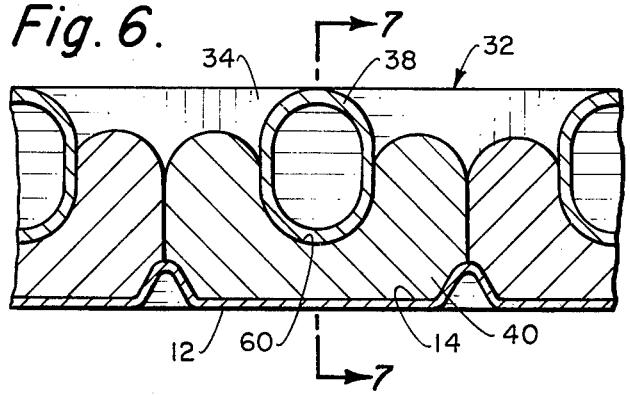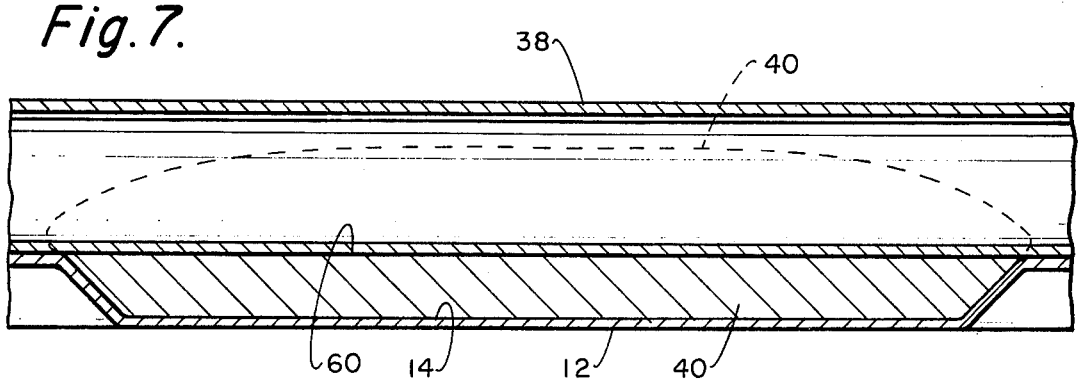

HOT DOG BUN BAKING PAN

BACKGROUND OF THE INVENTION

An extremely common type of food within the United States is what is termed a "hot dog" which is a small sausage. This hot dog is normally eaten in the accompaniment with a hot dog bun which is a bun which is supposedly especially designed to receive the hot dog. However, the normal baking technique for the hot dog bun is to just to merely bake an elongated bun and then thereafter place a partial elongated slot within the bun which permits the hot dog to be placed within the middle of the bun. However, the slot is, in no way, adapted to the size of a hot dog and when the bun is usually opened it frequently crumbles or breaks apart. Also, it is not uncommon to have the hot dog completely slip from the bun while it is being eaten.

Up to the present time, there has been no known baking pan designed specifically for the producing of a hot dog bun which had a groove formed therein which is specifically adapted to receive a hot dog.

SUMMARY OF THE INVENTION

The subject matter of this invention is believed to be summarily described within the Abstract Of The Disclosure and reference is to be had thereto.

The primary objective of this invention is to design a baking pan which can economically produce a hot dog bun which has an elongated groove formed therein which will readily receive, in a snug fitting manner, a conventional hot dog.

BRIEF DESCRIPTION OF THE DRAWINGS

FIG. 3 is a cross-sectional view taken along line 3—3 of FIG. 1;

FIG. 4 is a cross-sectional view through the base portion of the baking pan of this invention showing the dough receiving recesses having received initially a section of dough;

FIG. 5 is a view similar to FIG. 4 but showing the recess forming member having been placed in conjunction with the baking pan showing how the recess forming member contacts the dough;

FIG. 6 is a view similar to FIG. 5 but showing the dough having now been baked;

FIG. 7 is a cross-sectional view taken along line 7—7 of FIG. 6; and

DETAILED DESCRIPTION OF THE SHOWN EMBODIMENT

Figure 1:
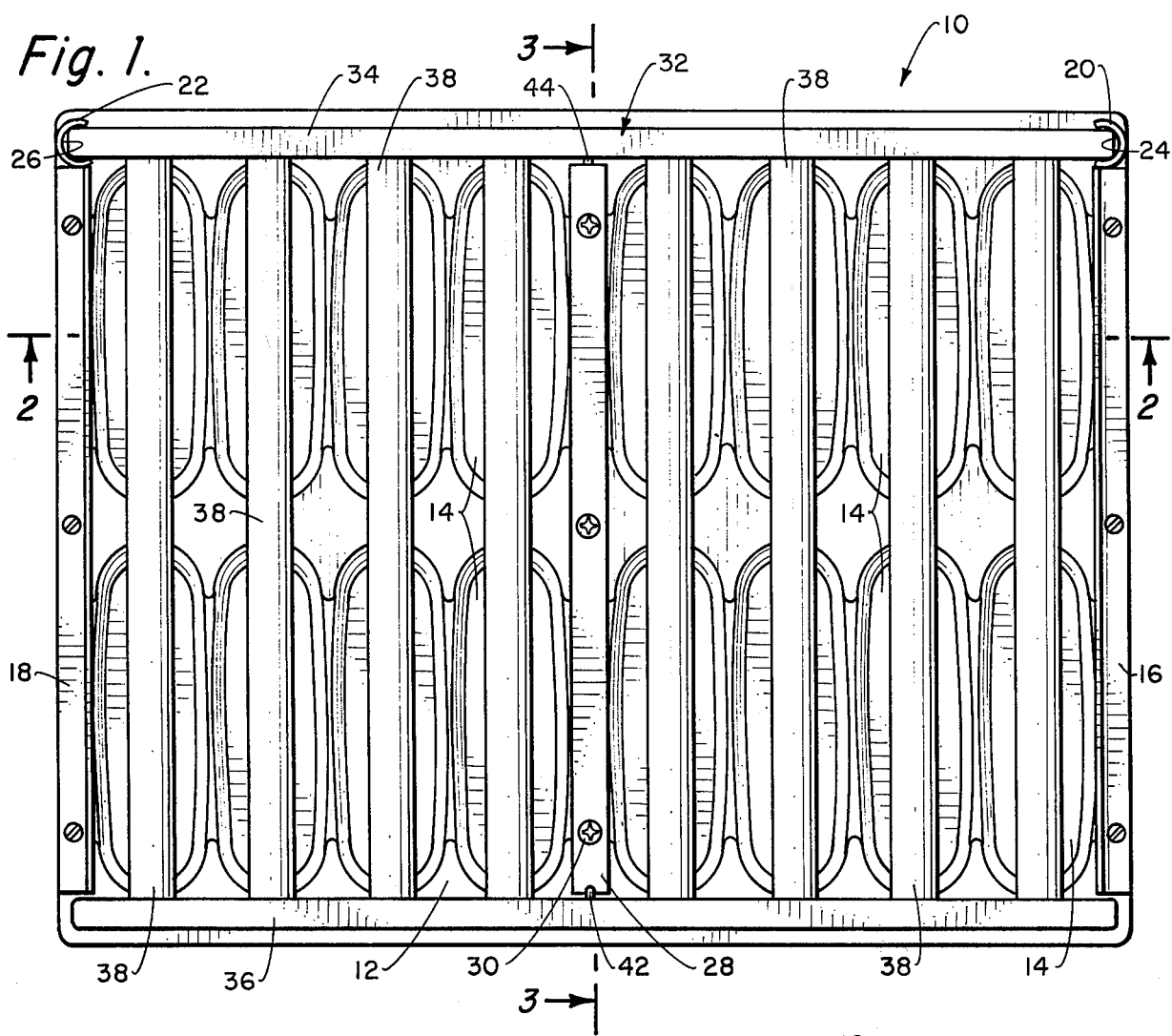
FIG. 1 is a plan view of the baking pan of this invention.
Figure 2:
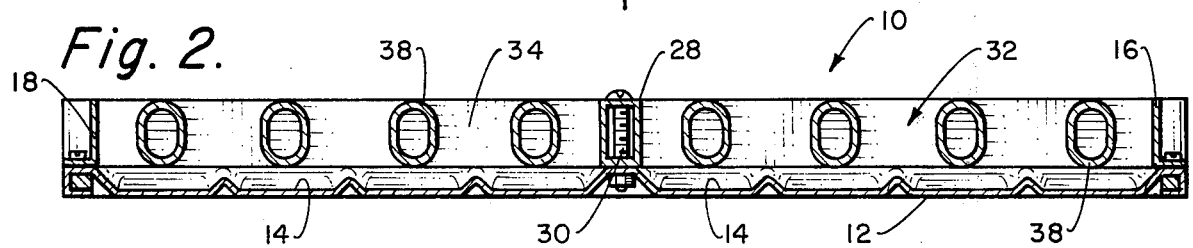
FIG. 2 is a cross-sectional view taken along line 2—2 of FIG. 1.
Figure 8:
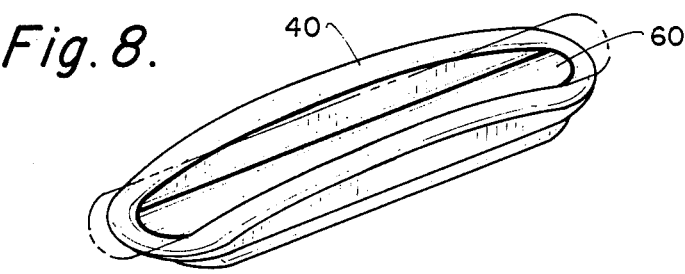
FIG. 8 is an isometric view of the hot dog bun produced by the baking pan of this invention.

Referring particularly to the drawings, there is shown in FIG. 1 the baking pan 10 of this invention which is composed primarily of a substantially planar shaped base 12 having a plurality of dough receiving recesses 14. The recesses 14 are formed elongated and in the basic shape of a conventional hot dog bun. It is to be noted that the base 12 includes sixteen in number of the dough receiving recesses 14. But it is within the scope of this invention that a greater number of such recesses can be employed or a lesser number. The base 12 is to be constructed of a rigid material that is conventionally used in baking which is usually a stainless steel.

Secured to the fore and aft edges of the base 12 are upstanding side members 16 and 18. These members 16 and 18 are merely attached to the base 12 by means of conventional screw type of fastening means.

Secured to one transverse side of the member 16 is a elongated U-shaped member 20 with a similar such member 22 being attached to the same side of the upstanding side wall 18. The U-shaped member 20 includes an elongated recess 24 with the member 22 including a similar elongated recess 26. The members 20 and 22 may be secured as by welding to the respective sidewalls 16 and 18 or they may be secured directly to the base 12 if desired.

Centrally disposed and positioned parallel to the upstanding members 16 and 18 is a center member 28. This member 28 is attached by bolts 30 to the base 12. The center member 28 is extends substantially the entire width of the base 12 and the center member 28 is also substantially equal in length to the upstanding sidewalls 16 and 18. The upstanding sidewalls 16 and 18 prevent the dough, during the baking operation, from moving exteriorly of the base 12. The center member 28 also has the same function for the recesses 14 located adjacent the longitudinal center of the base 12.

An overlying member 32 is adapted to be placed upon the base 12. This member 32 includes transverse sides 34 and 36 which are interconnected together by a plurality of spaced apart elongated rods 38. A given said rod 38 is conducted longitudinally across and in central relation in respect thereto each dough receiving opening 14. Each rod 38 is located a spaced distance above each dough receiving opening 14. It is to be noted that there are eight in number of the rods 38 but this number could readily vary depending on the number of openings 14. The rods 38 are secured by some means to the sidewalls 34 and 36, such as by welding or by conventional type of fastening means, such as bolts.

The transverse sidewalls 34 and 36 also function to restrain the dough in the transverse direction as the dough is being cooked.

With the member 32 placed upon the base 12, one end of the member 34 cooperates within the recess 26 with the other end of the member 34 cooperating with the recess 24. This cooperation precisely positions the member 32 upon the base 12 in order to obtain the desired form of hot dog bun 40.

It would normally be preferable to lock the member 32 when it is placed upon the member 12 in order to prevent the member 32 from moving during the baking operation. In order to achieve this end, located within the side member 36 is a bolt 42 and mounted within the side member 34 is a bolt 44. The bolts 42 and 44 extend inwardly from their respective sidewalls 36 and 34 a slight distance.

Fixedly mounted by fastener 46 to the base 12 and located interiorly of the center member 28 is a leaf spring 48. It is to be noted that leaf spring 48 has a center recessed area 50.

In a similar manner, a leaf spring 52 having a center recess area 54 is fixedly mounted by bolt 56 to the base 12 and also located interiorly of the center member 28 but at the opposite end from the leaf spring 48. The position of the springs 48 and 52 is such that when the member 32 is placed upon the base 12, that bolt 42 will snap into the recess 50 with the bolt 44 snapping into recess 54. This snapping action will secure the member 32 to the base 12 but will also readily permit disassociation by manual means of the member 32 from the base 12.

When it is desired to bake a hot dog bun by the baking pan of this invention, the member 32 is removed from the base 12. Sections of dough 58 are placed within each dough receiving section 14. The member 32 is then placed upon the base 12 so that the ends of the transverse side member 34 cooperate within the recesses 24 and 26. The member 32 is pushed down against the base 12 until the bolts 42 and 44 cooperate within the recesses 50 54. At this time the member 32 is then secured to the base 12. The baking pan 10 is then entirely placed within an even and heated until the dough 58 is completely bake. During the baking operation, the dough rises and conforms around its respective elongated rod 38 until the elongated recess 60 is formed within each resultantly formed hot dog bun 40.

After the buns 40 are completely baked, the baking pan 10 is removed from the oven and the member 32 is removed from the base 12 permitting complete removal of the resultantly formed hot dog buns 40. The process is then to be repeated to make further hot dog buns. It is to be noted that the use of the rods 38 in an oval shape is preferred so as the recess 60 is to be formed to the desired depth within the resultantly formed hot dog bun 40.

What is claimed is:

1. A hot dog bun baking pan comprising:
a substantially flat plane base including upstanding side wall members secured to said base, whereby said upstanding side walls prevent the dough during baking from moving exteriorly of said base, and, said base being divided into a plurality of dough receiving sections; an overlying member removably connectable to said base, said member having a pair of transverse sides which are interconnected by a plurality of elongated oval shaped rods, said member adapted to be placed upon said base with one of said rods to extend centrally through each said dough receiving section, whereby with dough placed within each dough receiving section and said member placed upon said base during the baking operation the dough will conform around its respective said rod resulting in the forming of a hot dog bun with an elongated hot dog receiving recess detachable connecting means between said member and said base to secure said overlying member to said base and, positioning means attached to said base, said positioning means to connect with said member to locate said member at a particular location upon said base, said positioning means comprising a pair of spaced apart U-shaped upright guide members both located directly adjacent the periphery of said base, each said guide member having a longitudinal groove therein with said grooves facing each other, each end of one of said transverse sides is to cooperate within a said longitudinal groove, each said elongated rods being oval shaped in cross section with the longest axis of the rod being located perpendicular to the plane of said base, whereby a deeper recess is formed within the formed hot dog bun which permits the bun to more readily hold the hot dog.

2. The baking pan as defined in claim 1 wherein:
said securing means comprising a leaf spring assembly, a protuberance assembly mounted on said member which acts against said leaf spring assembly and moves to a securing position when said member is placed upon said base.

* * * * *